(12) United States Patent
Tujkovic et al.

(10) Patent No.: US 10,178,581 B2
(45) Date of Patent: Jan. 8, 2019

(54) SWITCHED DIVERSITY IN DATA LINK LAYERS OF DIRECTIONAL NETWORKS

(71) Applicant: Facebook, Inc., Menlo Park, CA (US)

(72) Inventors: Djordje Tujkovic, Mountain View, CA (US); Sanjai Kohli, Manhattan Beach, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/978,148

(22) Filed: May 13, 2018

(65) Prior Publication Data

US 2018/0270706 A1    Sep. 20, 2018

Related U.S. Application Data

(63) Continuation of application No. 14/986,422, filed on Dec. 31, 2015, now Pat. No. 9,998,949.

(51) Int. Cl.
| | |
|---|---|
| H04W 28/04 | (2009.01) |
| H04B 7/0413 | (2017.01) |
| H04W 72/08 | (2009.01) |
| H04L 1/20 | (2006.01) |
| H04B 7/026 | (2017.01) |
| H04B 7/06 | (2006.01) |
| H04W 84/12 | (2009.01) |
| H04L 1/18 | (2006.01) |

(52) U.S. Cl.
CPC ........... *H04W 28/04* (2013.01); *H04B 7/026* (2013.01); *H04B 7/0413* (2013.01); *H04B 7/0617* (2013.01); *H04L 1/20* (2013.01); *H04W 72/082* (2013.01); *H04L 1/1845* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0083233 A1* | 4/2006 | Nishibayashi | H04L 1/1621 370/389 |
| 2009/0232243 A1 | 9/2009 | Tsuboi et al. | |
| 2011/0075757 A1 | 3/2011 | Nishio | |
| 2011/0305176 A1* | 12/2011 | Wentink | H04L 1/1607 370/310 |
| 2012/0257531 A1* | 10/2012 | Ko | H04B 7/0417 370/252 |
| 2013/0034076 A1 | 2/2013 | Ketchum et al. | |
| 2014/0009338 A1 | 1/2014 | Lin et al. | |
| 2014/0078880 A1 | 3/2014 | Bhattad et al. | |
| 2014/0192803 A1* | 7/2014 | Malik | H04L 45/00 370/389 |

(Continued)

*Primary Examiner* — Mohammad S Adhami
(74) *Attorney, Agent, or Firm* — Brian R. Short

(57) ABSTRACT

The disclosed embodiments seek to improve communication rates and lessen transmission errors between nodes in a communication network. The disclosed embodiments seek to improve reception bandwidth using one or more of (1) a MAC wrapper configured to integrate incoming data across sector arrays for use by the existing chipsets, and/or (2) a new interface modification to the chip design facilitating integrated log likelihood ratio processing from across multiple sector arrays. Sector coverage may be deliberately overlapped using the dynamic diversity achieved by the embodiments to compensate for environmental factors.

15 Claims, 8 Drawing Sheets

(56) References Cited

U.S. PATENT DOCUMENTS

| | | |
|---|---|---|
| 2014/0204837 A1 | 7/2014 | Park et al. |
| 2015/0365502 A1* | 12/2015 | Uyehara ................ H04L 69/08 455/561 |
| 2015/0372842 A1 | 12/2015 | Wicker, Jr. et al. |
| 2016/0072533 A1 | 3/2016 | Moon et al. |
| 2016/0105902 A1 | 4/2016 | Hirsch et al. |
| 2016/0381590 A1 | 12/2016 | Lysejko et al. |
| 2017/0126363 A1 | 5/2017 | Wang et al. |

* cited by examiner

SWITCHED DIVERSITY IN DATA LINK LAYERS OF DIRECTIONAL NETWORKS

RELATED APPLICATIONS

This patent application is a continuation of U.S. patent application Ser. No. 14/986,422, filed Dec. 31, 2015, which is herein incorporated by reference.

TECHNICAL FIELD

The disclosed embodiments relate generally to radio-frequency based data communication networks and in particular to directional network communication nodes.

BACKGROUND

High-speed, high-bandwidth communications are increasingly in demand as populations and population densities increase. Distributed wireless networks composed of multiple locally-communicating Multiple-Input-Multiple-Output (MIMO) nodes and/or directional, beam-steered/formed antenna distributions may be able to meet this demand. Each node may be used to convey network communications between, e.g., an Internet backbone and various end user devices. The distributed nodes may be particularly useful in dense urban areas or in remote locations lacking substantial infrastructure. The nodes can be installed and managed by local residents, facilitating a versatile solution adaptive to the needs and circumstances of a particular community.

Unfortunately, it can be difficult to maintain a healthy "link budget" when deploying outdoor millimeter wave (mmW) communications. A link budget is an accounting of all gains and losses between a transmitter and a receiver. Increases in power and/or beamforming (BF) gain in the transmit portion of the link may be quickly saturated by effective isotropic radiated power (EIRP) limits. Accordingly, there is a need for more efficient and effective receiver solutions.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
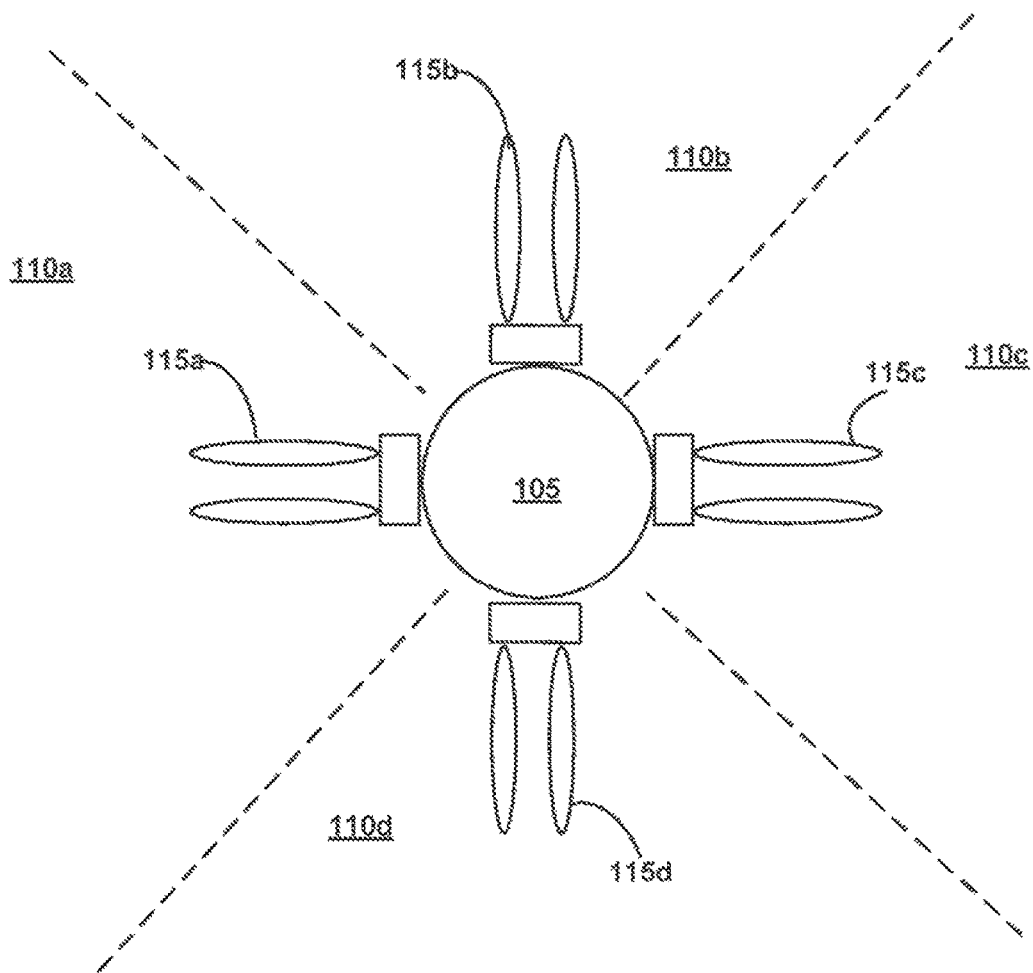
FIG. 1 is a block diagram illustrating some components of a wireless network node as may be implemented in some embodiments.

While the flow and sequence diagrams presented herein show an organization designed to make them more comprehensible by a human reader, those skilled in the art will appreciate that the actual data structures used to store this information may differ from what is shown in that they, for example, may be organized in a different manner, may contain more or less information than shown, may be compressed and/or encrypted, etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

The disclosed embodiments are directed to improving data rates and reducing errors in transmissions between nodes of a wireless communication network. As node transmission power is quickly saturated, improvements must be made at the receiving end. Unfortunately, most chips on the market are ill-suited for improving reception bandwidth because they are designed for short-range integrated solutions. In an open systems interconnection (OSI) model, information that is transmitted from a sender to a receiver passes through a number of layers including a physical layer (PHY) 1, a data link layer 2, a network layer 3, a transport layer 4, a session layer 5, a presentation layer 6, and an application layer 7. As will be explained in further detail below, the present disclosure is related to moving the error detection that is performed on received data from a physical layer (PHY) to data link layer 2 in the OSI model so that software or programmed logic can determine which of two or more transmissions of the data should be used for further processing. In another embodiment, a front-end software program or programmed logic is added to perform log likelihood ratio (LLR) analysis of received transmissions before the layer 2 logic creates media access control (MAC) protocol data units (MPDUs).

Accordingly, the disclosed embodiments seek to improve reception speeds and reduce transmission errors using one or more of: (1) a MAC wrapper configured to integrate incoming data across sector arrays for use by existing chipsets that process the received data, and/or (2) a new interface modification to the chip design facilitating integrated LLR processing of data received across multiple sector arrays. Sector coverage may be deliberately overlapped using the dynamic diversity achieved by the embodiments to compensate for environmental factors.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview

Turning now to the Figures, FIG. 1 is a block diagram illustrating components of a wireless network node 105 as may be implemented in some embodiments. In this example, the node 105 has four sets of MIMO antennas 115a-d, which may be used to directionally communicate with other nodes in one of four different sectors 110a-d. Though only two antennas are shown for use in each sector, one having ordinary skill in the art will recognize that many more antennas may be used and that a node may transmit and receive in more or fewer sectors. Some nodes in a network may be able to transmit and receive in a different number of sectors than other nodes and have different numbers of antennas per sector than other nodes in the network. The antennas may be used to steer and/or form a directional beam for transmission/reception with another node. In some embodiments, the node may even be able to steer the beam from one set of antennas into the sector of another antenna set. The node may be fitted with additional hardware, such as a GPS unit and a wireless access point, such as an 802.11 access point. In some embodiments, the nodes in the network communicate via a standardized communication protocol such as 802.11ad. However, other communication protocols could be used.

Figure 2:
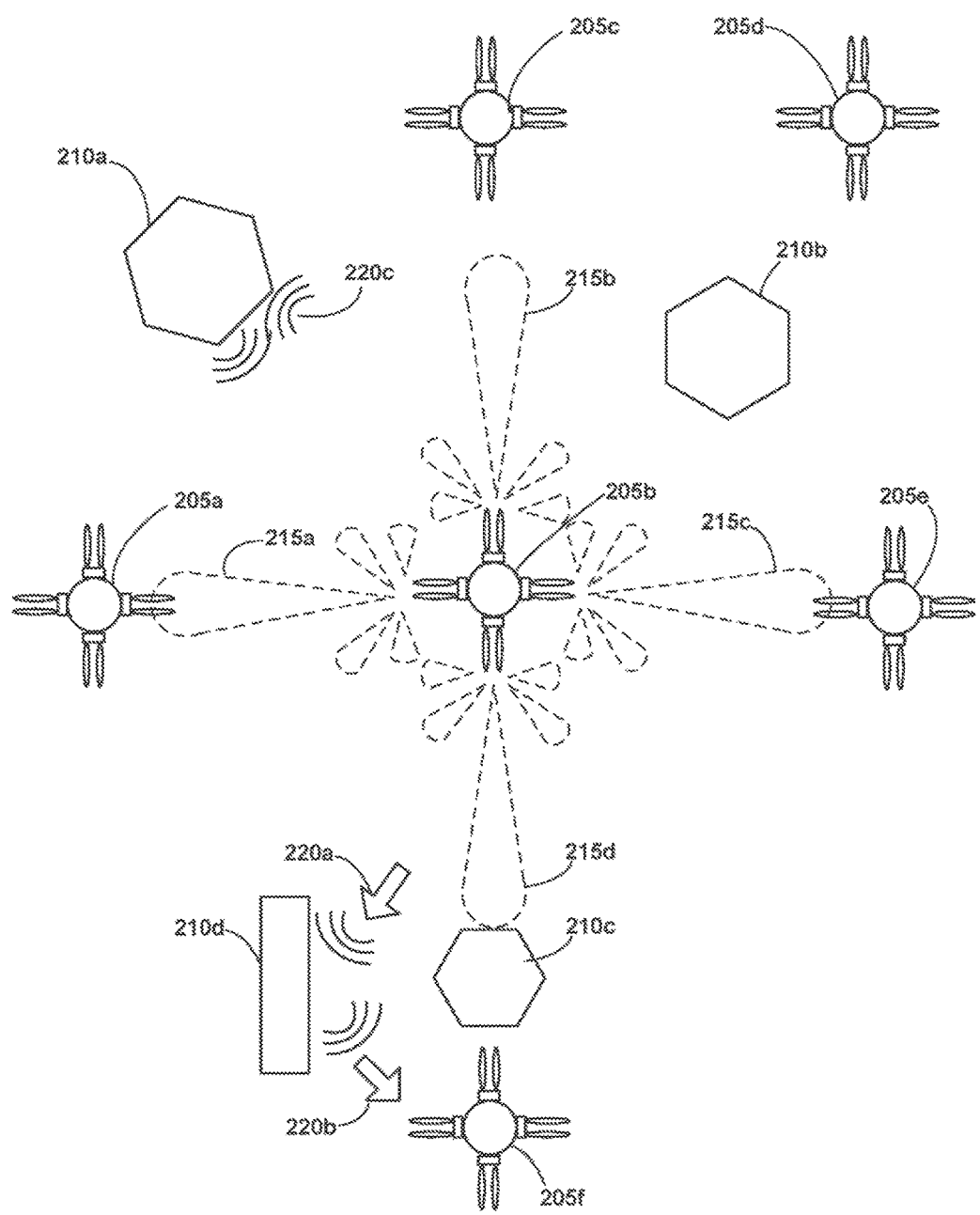
FIG. 2 is a block diagram illustrating an example network topology with several nodes as may be implemented in some embodiments.

FIG. 2 is a block diagram illustrating an example network topology with several nodes as may be implemented in some embodiments. In the illustrated portion of a network, six nodes 205a-f may be used to route communications from end users to a computer communication link (Internet, local area network, etc.) backbone. For example, a node 205b may use each of directional beamformed patterns 215a-d to communicate with peer nodes 205a,c,e,f. Obstacles 210a-d that hinder communication between the nodes may be transient (e.g., buses, people, animals, weather conditions, etc.) or fixed (trees, buildings, geological structures, etc.). Radiation emissions incident on the obstacles 210a-d may be reflected 220c. In some embodiments, reflection may be used to avoid one obstacle 210c by using waves 220a, 220b that are reflected off an obstacle 210d. Beam steering may be used to take advantage of the environment e.g. by what obstacles exist or are predicted to exist at a specified time. Similarly, reflections 220c can be reflected off an object 210a in order to advantageously establish a communication link with another node in the communication network. In some embodiments, each node has routing tables (not shown) that specify the transmit and receive beamforming directions to be used when communicating with other nodes in the network. Such directions may be dynamically varied to accommodate changing propagation conditions. As an example, a delivery truck may make deliveries ever Monday from 9:00 to 11:00 am. A reflection off this truck may assist one link but block a second link.

Architecture—Consolidated L2/MAC

Various embodiments consider modifications to a node's receiver components so as to increase the link margin. Many millimeter wave (mmW) radio-frequency (RF) chips on the market are designed for highly integrated solutions and are usually deployed for short-range indoor applications.

In some embodiments, these chips may limit the maximum number of antennas in the receiver array (e.g., to 32). This limited number of antennas may be insufficient for closing the link beyond a minimum distance. Various of the disclosed embodiments address these limitations by applying one or more of the following solutions: (1) the inclusion of a decision directed switched diversity on the layer 2 (L2 layer) of the receiver as a pragmatic approach to retrofit existing mmW chips for improved receiver gain; and (2) the inclusion of a log likelihood ratio (LLR) interface definition between the physical PHY and MAC sub-layers of the communication protocol to enable efficient diversity combining. Both solutions may generalize to an arbitrary wireless or wired system where redundancy in the link is required due to intermittent failures in the propagation channel.

Figure 3:
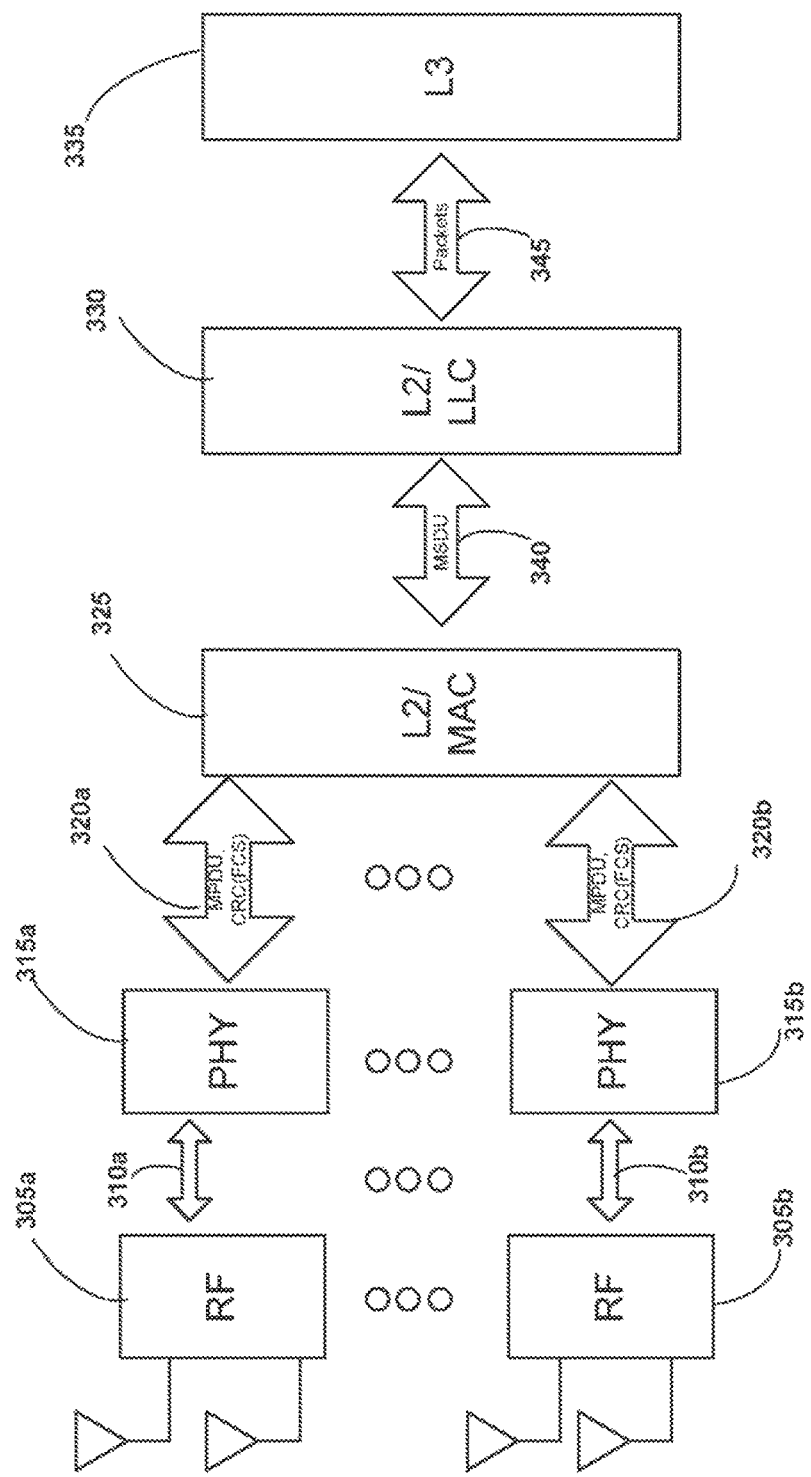
FIG. 3 is a block diagram illustrating components in an L2 MAC switching solution as implemented in some embodiments.

FIG. 3 is a block diagram illustrating components in an L2 switching solution as implemented in some embodiments. A plurality of radio frequency (RF) modules 305a-305b may relay signals 310a-310b from multiple antennas to a plurality of physical layer components 315a-315b. In some embodiments, the RF modules operate in the unregulated 60 GHz frequency band. In some embodiments, the MAC protocol data unit (MPDU) messages 320a-320b employing Frame Control Sequences (FCS) (e.g. Cyclic Redundancy Checks (CRC)) may convey the data to the L2/MAC 325 component of the OSI model. Thus, multiple L0/L1s (RFIC+PHY) processes may receive PHY frames over the air in a synchronized fashion without knowing one another. To improve reception in the nodes, a wrapper is added to the layer 2 components so that the selection of which copy of a frame should be used for further processing is not made at the PHY layer. Instead, all frames are passed up to the L2/MAC layer component 325 to analyze the frames and select one (or a combination) of the frames for further processing. The L2/MAC component 325 may likewise communicate MAC Service Data Unit (MSDU) messages 340 with the L2 Logical Link Controller component 330. The L2 Logical Link Controller 330 will organize received MSDUs into packets 345 that are sent to the L3 control 335. The frames may pass through the decoded MPDUs 320a-320b to the L2/MAC 325 together with CRC and/or check sum (CS) status check bits. The L2/MAC component 325 may choose the MPDU that passes the CRC (or frame control sequence (FCS)) for further processing; this may reflect the MPDU that was successfully decoded. As will be understood by those skilled in the art, MSDUs are MAC service data units which are the units of transmission used at the MAC layer and received from an upper layer. MPDUs are MAC protocol data units, which are the frames passed from the MAC layers into the physical PHY layer.

In some embodiments, a software program or logic hardware is added to the node receivers to collect the MPDUs received from the physical layer components 315a-315b and to provide each of the MPDUs to the L2/MAC layer components. The following example pseudocode illustrates the functions performed by the layer 2 wrapper performed by the software program or logic hardware.

```
(MPDU_out, FCS_out)=MAC_switch(MPDU1_in, FCS1, MPDU2_in, FCS2)
     MPDU_out=MPDU1
     FCS_out =FCS1
If FCS2==pass
          MPDU_out=MPDU2_in
          FCS_out=FCS2
     end
```

In this example, a first MPDU frame (e.g., MPDU1) is selected for further processing by the L2/MAC layer unless a second frame MPDU2 passes its error checking routine. If so, the passing frame is the frame that is forwarded to higher layers in the communication protocol for further processing. In some embodiments, the software program or logic hardware that implements the wrapper modifies the OSI model so that the PHY layer components do not perform the error checking on received frames. Instead, all received frames are forwarded to the higher layer of the communication protocol so that the higher layer can make a determination of which frame to process.

The MSDU passed out of the layer two wrapper can in some embodiments represent an aggregated MSDU (A-MSDU). The selection of the frame that passes its error checking in layer 2 of the communication protocol has the effect of increasing the gain of the signals received from coherent combinations at the L0 and L1 layers.

Architecture—Plural L2/MAC

Figure 4:
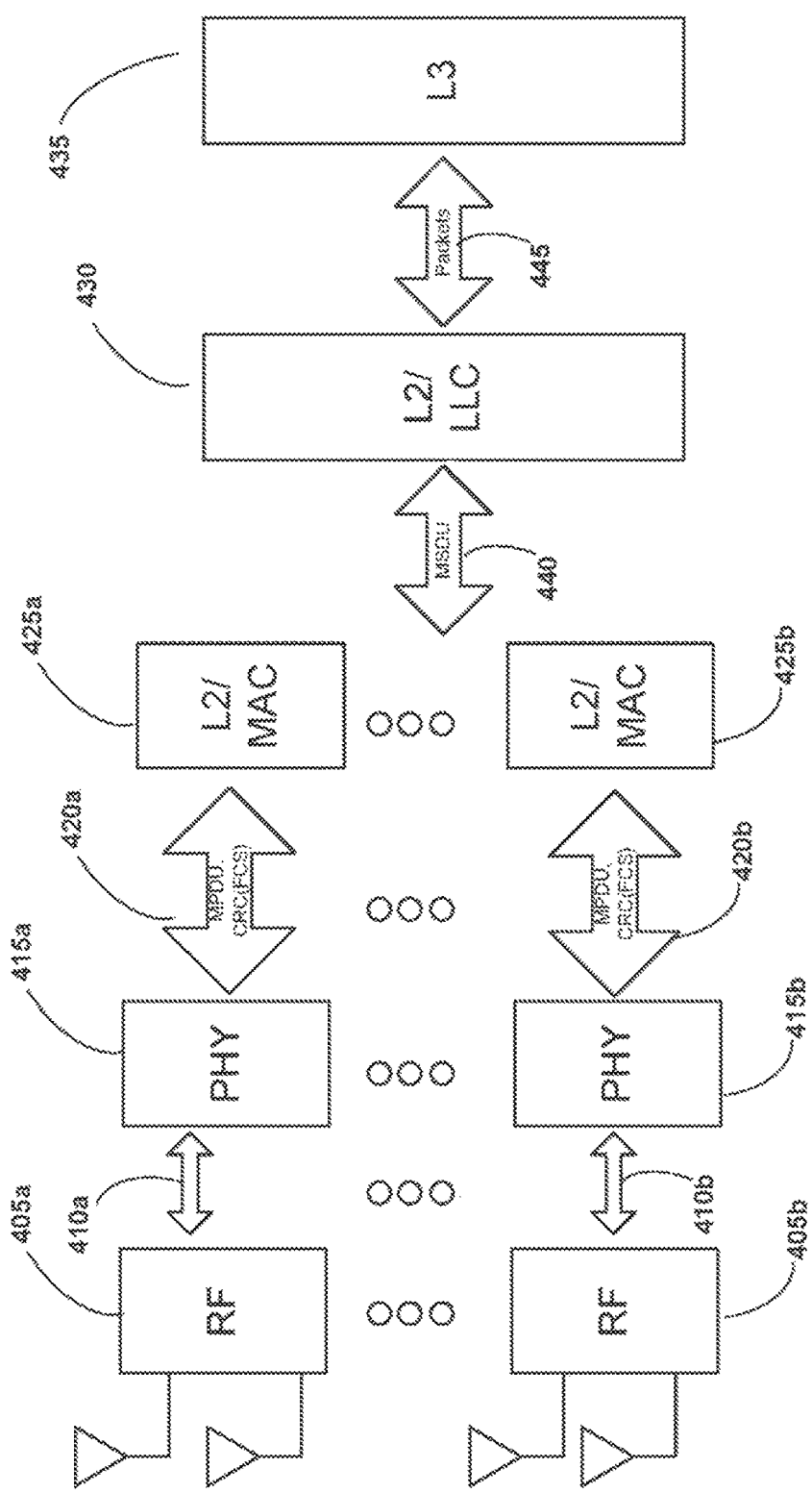
FIG. 4 is a block diagram illustrating components in an L2 MAC switching solution with separate L2/MAC components as implemented in some embodiments.

FIG. 4 is a block diagram illustrating components in an L2/MAC switching solution with separate L2/MAC components as implemented in some embodiments. Again, separate RF layer components 405a-405b, produce data signals 410a-410b, that are received by a number of PHY layer components 415a-415b. The PHY layer components produce corresponding MPDU messages 420a-420b containing frames that are sent to separate L2/MAC layer components 425a-425b. Embodiments may disable ACK feedback on MPDU messages 420a-420b and the switching can therefore be pushed to the L2/LLC layer component 430. In this embodiment, the L2/LLC component 430 receives MPDUs from multiple L2/MAC components 425a-425b. The L2/LLC layer component 430 selects one MPDU for further processing or can combine or aggregate the received MPDUs in a manner that reduces errors in the received frames. Frames received by the L2/LLC layer component 430 are assembled into packets that are transmitted to the layer 3 (L3) component 435 of the communication protocol. A single MPDU can contain multiple aggregated MSDUs. The ARQ retransmission is typically done based on the FCS, which protects the whole MPDU. Therefore, ACK needs to be disabled to allow individual MSDUs in aggregated MSDU (A-MSDU) to be selected at the LLC level.

After MSDU aggregation by the L2/LLC layer component 430, the handling of packets 445 at the L3 component 435 may occur as previously described. Again, switching can be done across arrays belonging to the same sector or belonging to different sectors in the given communication node.

Architecture—Software/Firmware Interface

Figure 5:
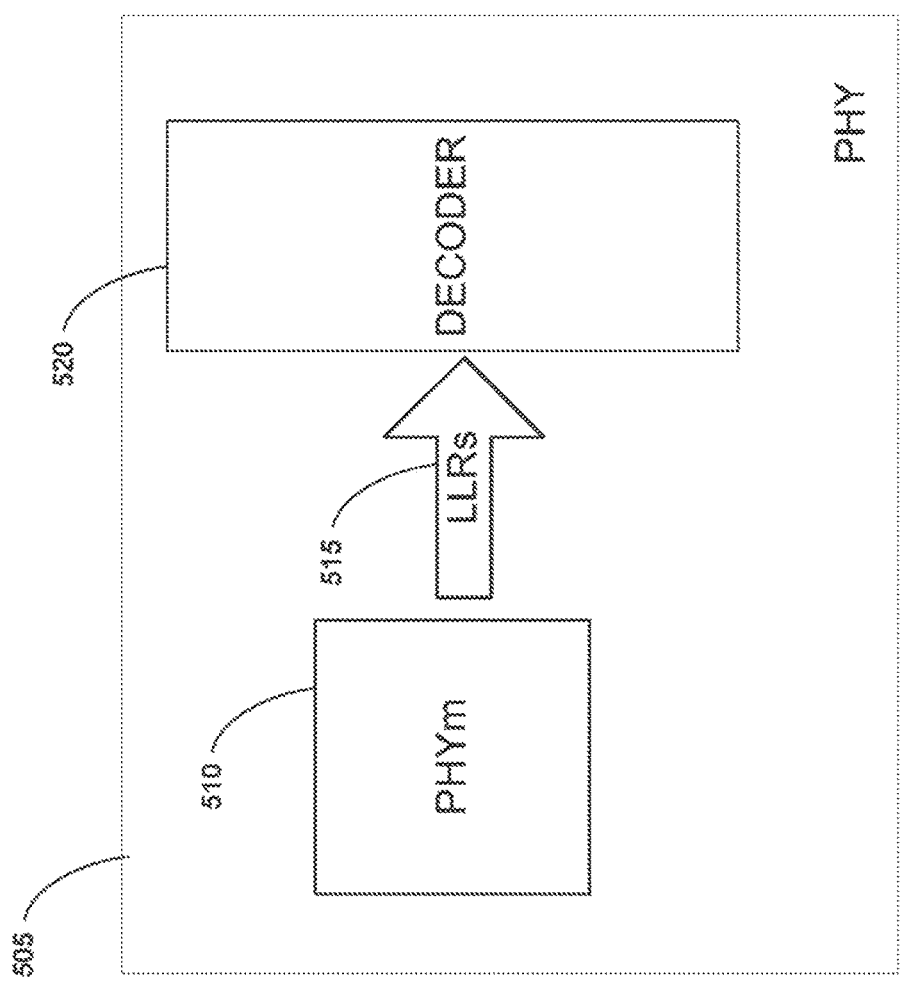
FIG. 5 is a block diagram illustrating a physical layer separation on the receiver side as may be implemented in some embodiments.

FIG. 5 is a block diagram illustrating a physical layer 505 separation on the receiver side as may be implemented in some embodiments. These embodiments may break up the PHY layer 505 components on the receive side except the output of the equalizer (denoted as PHYm 510) and decoder 520. Equalizer 510 is configured to produce log likelihood ratios (LLRs) 515 and may optionally produce a scaling factor used for combining frames across multiple PHY layer components. Note that such switching can be done across arrays belonging to the same sector or belonging to different sectors in the given communication node.

Figure 6:
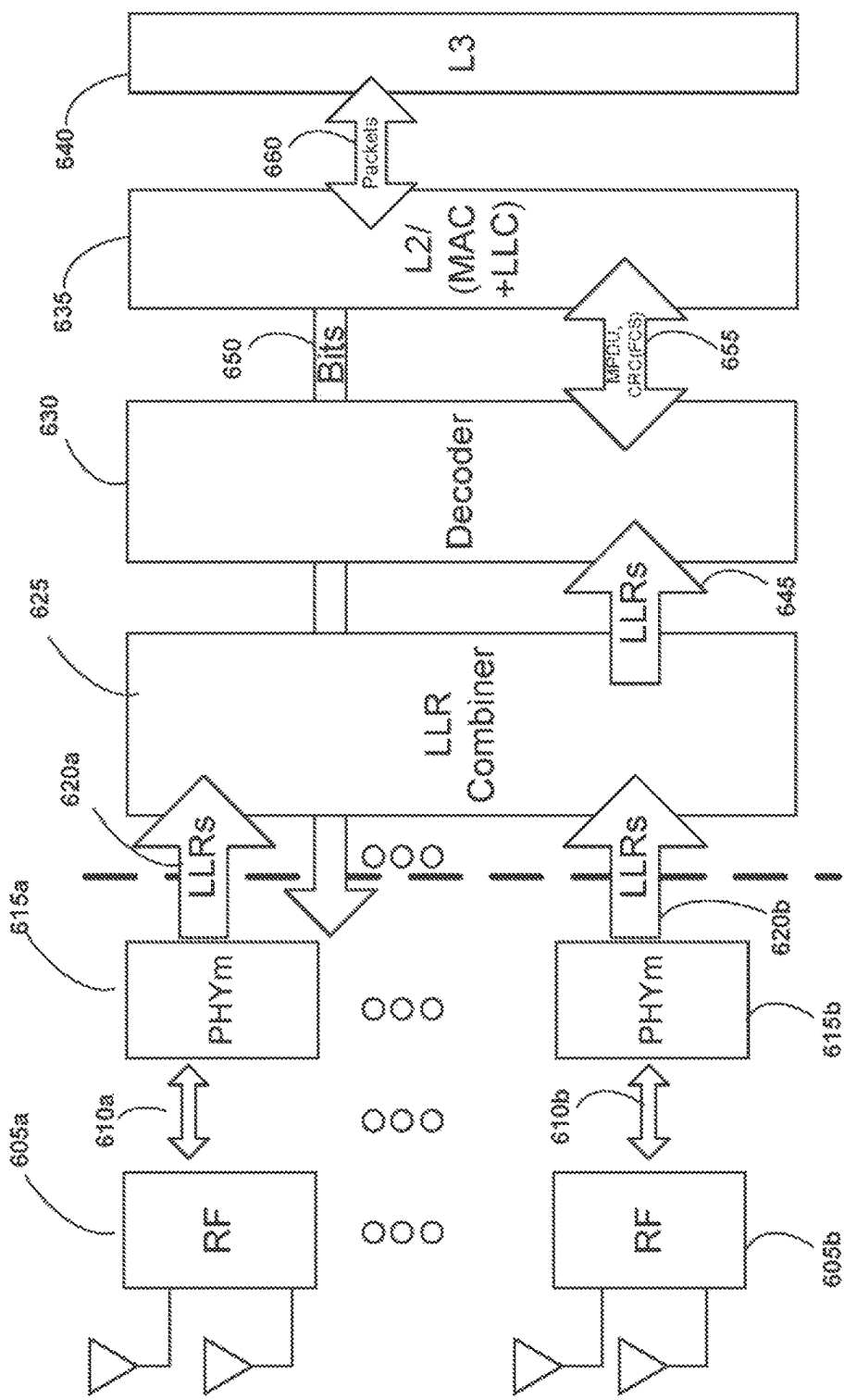
FIG. 6 is a block diagram illustrating a physical layer separation on the receiver side as may be implemented in some embodiments.

FIG. 6 is a block diagram illustrating a physical layer separation on the receiver side as may be implemented in some embodiments. Again, separate RF layer components 605a-605b produce signals 610a-610b that are delivered to different physical layer (PHY) components. The physical layer components 615a-615b forward frames along with log likelihood ratios for the frames to a log likelihood combiner 625. In some embodiments, the log likelihood combiner 625 combines the various log likelihood ratios received from the physical layer components 615a-615b according to a number of weights that are derived from channel conditions such as interference on the network or other factors. For example, LLRs with some pre-configured bit width (example 4 or 8 bits per information bit of MPDU) can be passed for whole MPDU across the XGMI, USB or PCIe interfaces. The resulting combined LLR is then sent to a decoder 630 that relays the data via MPDU messages 655 to an L2/MAC+ LLC component 635. The L2/MAC+LLC component 635 combines the frames into data packets sends the data packets 660 to an L3 layer component 640. Bits 650 may be transmitted from the L2/MAC+LLC component 635 back to the PHY layer components directly. Each bit of MPDU information packet on transmitter side is, after receiver processing (on for example the PHYm to Decoder interface), represented with LLR (aka soft information described by 4 or 8 bits for example).

The following example pseudocode illustrates the functionality performed by the LLR combiner 625 and decoder 630. Such pseudocode can be implemented as a software program or as a programmed logic circuit (FPGA, ASIC etc.).

(LLR_out)=LLRcombiner(LLR1_in, alpha1, LLR2_in, alpha2)

LLR_out=alpha1*LLR1_in+alpha2*LLR2_in alpha 1 and alpha 2 are scaling factors that are proportional, for example, to propagation channel conditions (Carrier to Interference-plus-Noise ratio (CINR), interference level, etc.).

In this embodiment, frames are combined according to weighted sums of their LLR values where the weights applied to each LLR are determined by propagation channel conditions. For example, data received on channels having poor conditions are weighted less than data received on channels having good propagation conditions. In some embodiments, the LLR combiner 625 and decoder 630 are implemented as modifications to receiving chipsets for use in radio frequency communication networks.

Figure 7:
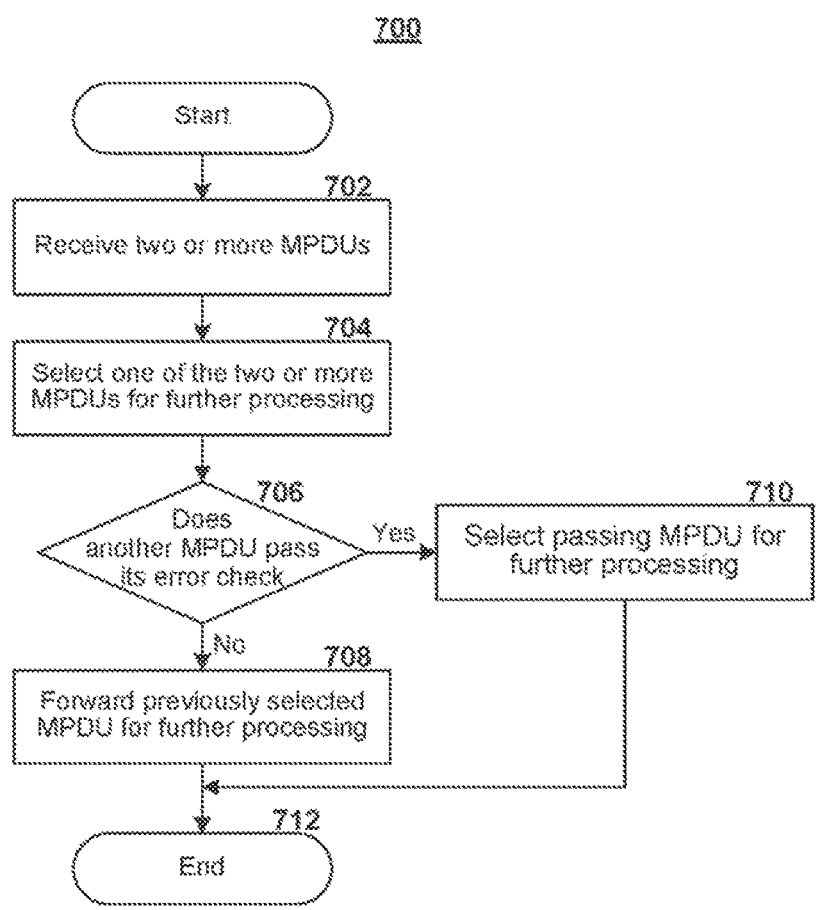
FIG. 7 is a flow diagram illustrating operations at an interface wrapper as may be performed in some embodiments.

FIG. 7 is a flow diagram illustrating operations at an interface wrapper as may be performed in some embodiments. Although the steps shown are described in a particular order for ease of explanation, it will be appreciated that the steps could be performed in a different order or that alternative steps could be performed in order to achieve the functionality described.

Beginning at 700, the layer 2 component of the communication protocol receives two or more MPDUs from lower layer components at 702. At 704, the layer 2 component selects one of the received two or more MPDUs for further processing. Such a selection can be made via a number of mechanisms such as the first MPDU received or the last MPDU received, a sequentially or randomly changing MPDU etc. At 706, the layer two component determines if another of the two or more MPDUs received passes its frame control sequence (e.g. its error checking test). If so, the passing MPDU is selected for further processing at 710. If the other of the MPDUs does not pass its error testing at 706, then the previously selected MPDU is forwarded for further processing at 708. In some embodiments, the further processing involves forwarding the selected MPDU to higher layer components in the communication protocol. The logic ends at 712, until the next number of MPDUs is received by the lower layer components in the communication protocol.

Computer System

Figure 8:
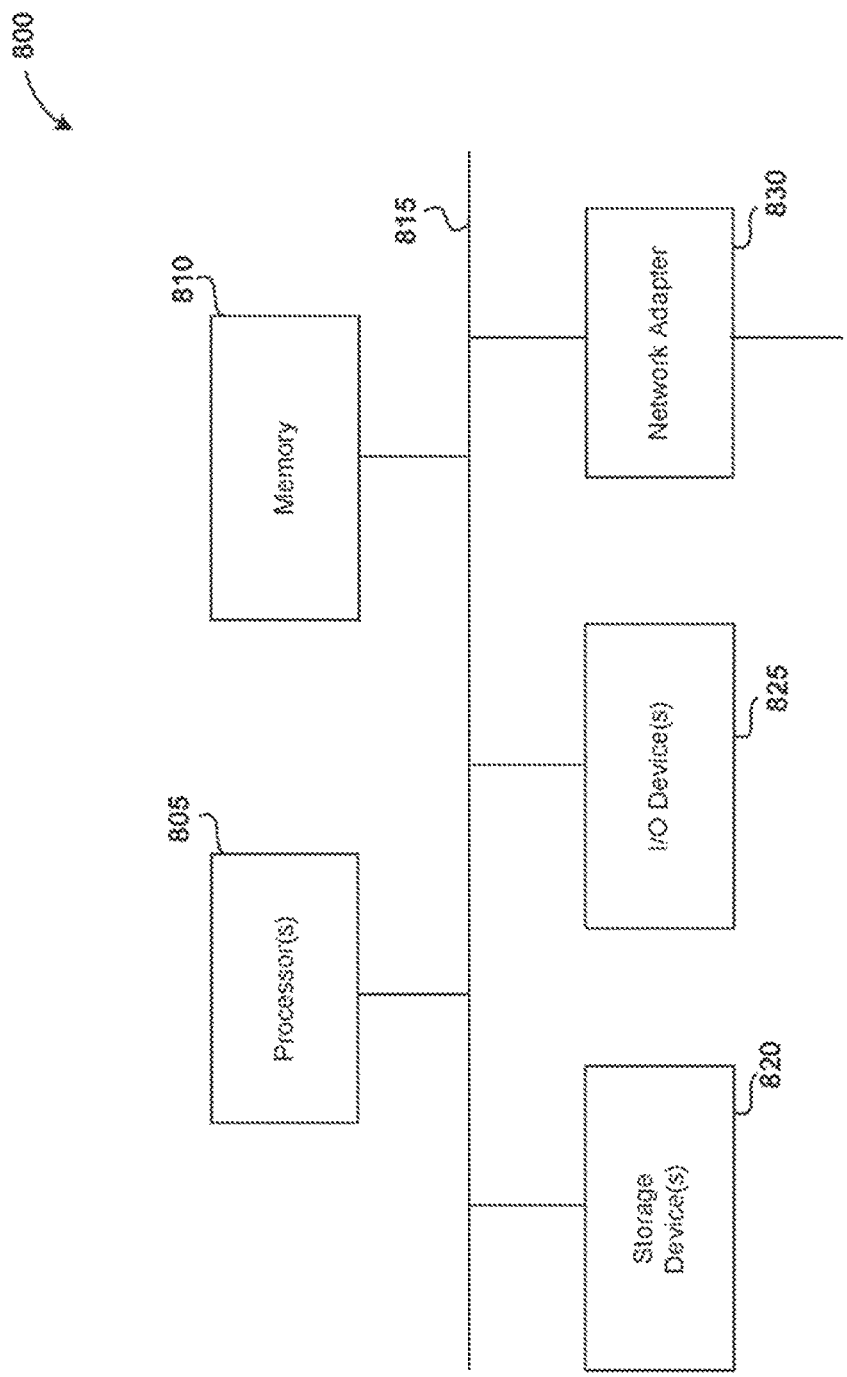
FIG. 8 is a block diagram of a computer system that may be used to implement some features of the embodiments.

FIG. 8 is a block diagram of a computer system that may be used to implement features of some of the embodiments. The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 810 and storage devices 820 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the computing system 800 by downloading it from a remote system through the computing system 800 (e.g., via network adapter 830).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

What is claimed:

1. A communications system configured to operate in accordance with a layered communication protocol, comprising:
    a plurality of radio frequency components coupled to a plurality of antennas that are configured to receive data from a physical channel;
    a plurality of physical (PHY) layer components, wherein the PHY layer components are connected in parallel, and each PHY layer component is configured to receive data from a one of the plurality of radio frequency components;
    a plurality of layer 2 (L2/MAC) components configured to receive MAC protocol data units (MPDUs) from a PHY layer component, and wherein the L2/MAC components are configured to disable an ACK feedback on the received MPDUs and to test the received MPDUs for errors and to select at least one of the received MPDUs for further processing based on the error testing performed; and a layer 2 logical link control (L2/LLC) component configured to receive the selected MPDUs from the plurality of L2/MAC components and to aggregate the selected MPDUs into packets for use in the communication protocol.

2. The communications system of claim 1, wherein a wrapper is added to the layer 2 components, and wherein selection of which copy of a frame is used for further processing is not made at the PHY layer components.

3. The communications system of claim 1, wherein all frames are passed up to the L2/MAC layer components to analyze the frames and select one or a combination of the frames for further processing.

4. The communications system of claim 1, wherein disabling the ACK feedback on the received MPDUs allows the L2/LLC to select individual MAC service data units (MSDUs) in aggregated MSDUs.

5. The communications system of claim 1, wherein each of the plurality of radio frequency components is configured to receive a signal from a different sector at a network node installation.

6. The communications system of claim 1, wherein the L2/MAC component is configured to select an MPDU from the received MPDUs based on a cyclic redundancy check (CRC) value in the received MPDUs.

7. A computer-implemented method for handling data received from a plurality of radio frequency RF modules comprising:

receiving two or more MAC protocol data units (MPDUs) at a layer 2 component of a communication system that operates according to a layered communication protocol, wherein the two or more MPDUs are received from a plurality of physical (PHY) layer components, wherein the PHY layer components are connected in parallel, and each PHY layer component is configured to receive data from a one of a plurality of radio frequency components simultaneously with the other PHY layer components receiving data from the plurality of radio frequency components, wherein the plurality of radio frequency components coupled to a plurality of antennas that are configured to receive data from a physical channel, and wherein an ACK feedback on the two or more received MPDUs is disabled;

selecting one of the received two or more MPDUs in the layer 2 component for further processing; and determining in the layer 2 component whether another of the two or more MPDUs passes an error checking test; and if so, selecting the passing MPDU for further processing and if the other of the received MPDU does not pass its error checking test, then using the previously selected MPDU for further processing.

8. The communications system of claim 7, wherein the layer 2 component is an L2/MAC component.

9. The communications system of claim 8, wherein the L2/MAC component is configured to select an MPDU from the received MPDUs based on a cyclic redundancy check (CRC) value in the received MPDUs.

10. A method of operating in accordance with a layered communication protocol, comprising:

receiving, by a plurality of radio frequency components coupled to a plurality of antennas, data from a physical channel;

receiving, by each PHY layer component of a plurality of physical (PHY) layer components, data from a one of the plurality of radio frequency components, wherein the PHY layer components are connected in parallel;

receiving, by a plurality of layer 2 (L2/MAC) components, MAC protocol data units (MPDUs) from a PHY layer component, and wherein the L2/MAC components are configured to disable an ACK feedback on the received MPDUs and to test the received MPDUs for errors and to select at least one of the received MPDUs for further processing based on the error testing performed; and receiving, by a layer 2 logical link control (L2/LLC) component, the selected MPDUs from the plurality of L2/MAC components and aggregating the selected MPDUs into packets for use in the communication protocol.

11. The method of claim 10, further comprising adding a wrapper to the layer 2 components, and wherein selection of which copy of a frame is used for further processing is not made at the PHY layer components.

12. The method of claim 10, further comprising passing all frames to the L2/MAC layer components to analyze the frames and select one or a combination of the frames for further processing.

13. The method of claim 10, wherein disabling the ACK feedback on the received MPDUs allows the L2/LLC to select individual MAC service data units (MSDUs) in aggregated MSDUs.

14. The method of claim 10, wherein each of the plurality of radio frequency components is configured to receive a signal from a different sector at a network node installation.

15. The method of claim 10, wherein the L2/MAC component is configured to select an MPDU from the received MPDUs based on a cyclic redundancy check (CRC) value in the received MPDUs.

* * * * *